United States Patent

Duncan

[11] 4,101,752
[45] Jul. 18, 1978

[54] PROCESS FOR WELDING CORNER CELLS IN FUEL ASSEMBLY GRIDS

[75] Inventor: Robert Duncan, Fork, S.C.

[73] Assignee: Westinghouse Electric Corp., Pittsburgh, Pa.

[21] Appl. No.: 723,271

[22] Filed: Sep. 15, 1976

[51] Int. Cl.$^2$ .................................. B23K 11/10
[52] U.S. Cl. ..................... 219/91.2; 219/86.24; 219/158; 269/47
[58] Field of Search ............ 219/86, 87, 91, 117 HD, 219/158, 161; 228/212; 269/47

[56] References Cited

U.S. PATENT DOCUMENTS

| | | | |
|---|---|---|---|
| 1,894,454 | 1/1933 | Todt | 219/158 |
| 2,404,857 | 7/1946 | McLaren | 228/212 |
| 3,054,887 | 9/1962 | Brooks | 219/158 |
| 3,068,351 | 12/1962 | Longenecker et al. | 219/158 X |
| 3,789,184 | 1/1974 | Piepers et al. | 219/91 X |

FOREIGN PATENT DOCUMENTS 30,868  6/1966  Japan .................. 219/86

Primary Examiner—J. V. Truhe
Assistant Examiner—N. D. Herkamp
Attorney, Agent, or Firm—J. R. Campbell; Z. L. Dermer

[57] ABSTRACT

A process for welding the adjacent ends of frame members peripherally surrounding the interleaved straps of a fuel assembly grid which includes placing the assembled grid and its frame members into a fixture made to substantially the same dimensions as the outside dimensions of the grid. The side members of the frame are arranged such that a space appears at each of the four corners and a special tool placed in each of the four corner cells of the grid is designed to have an opening which corresponds to the openings formed on each corner of the fixture. After the tooling is placed in each of the four corner cells, the assembled grid and fixture is then placed in welding apparatus such that a welding tip thereof is placed in the tool located in a corner cell. Since the opening in the tool and between the plates of the fixture and at each corner are in alignment, the welding tip accordingly moves through the openings and into contact with the overlapping ends of the frame members placed on the peripheral surface of the grid. The upper welding tip is then brought into contact with the other side of the overlapping ends and a spot weld accordingly applied to the frame member overlapping ends.

4 Claims, 4 Drawing Figures

PROCESS FOR WELDING CORNER CELLS IN FUEL ASSEMBLY GRIDS

BACKGROUND OF THE INVENTION

The invention described herein relates to grids used with fuel assemblies in a nuclear reactor and more particularly to a method for welding the overlapping ends of frame members which peripherally enclose interleaved grid straps forming the grid.

As is well known in the art, a fuel assembly grid consists of multiple interleaved metal straps of egg crate configuration which form cells arranged to receive fuel rods and control rod guide thimbles of a fuel assembly. These grids which are spaced along a fuel assembly length are made to precise tolerances to help assure uniform transfer of heat from each fuel rod to coolant circulated up through the assembly and to provide for the generation of power according to pre-established modes of operation.

A particular problem encountered in manufacturing grids of this type is that to obtain exact dimensions in all of the egg-crate cells, four separate frame straps or plates are placed around the grid perimeter, one on each side, and welded together at their overlapping edges at the grid corners. During the time of welding, distortion of the frame straps often takes place and to a degree sufficient to preclude the insertion of fuel rods therein. As a result, reworking of the grid to bring it within proper dimensions is necessary and if this cannot be done, the grid is scrapped. Different designs of tooling therefore have been used to minimize this problem but a size variation in the corner cells still takes place primarily because of contraction of the welded components when subjected to weld heat. Such variation also exceeds established tolerances thus requiring cutting of the weld, reworking of the grid or scrapping the frame because the corner cells were not of an acceptable size.

SUMMARY OF THE INVENTION

Briefly stated, the above disadvantages of the prior art are eliminated by positioning a frame member on each side of an interleaved grid so that the ends of one frame member overlap the ends of an adjacent frame member outwardly from each corner of the grid. With the parts in this position, a weld brace inserted in each corner cell forms a cell area of the desired size and further locates the exact part where the overlapping ends of the adjacent frame member should be welded. After the weld is made, a fixture holding the grid is reversed and the tool is inserted into the other end of the cell and the welding process is then repeated to establish a second spot weld along the height of the grid.

An object of the invention therefore is to provide a process for welding framing members around a grid of egg crate configuration without materially distorting the weld material and therefore the dimensions of each corner cell.

The subject matter of this invention is particularly pointed out and distinctly claimed in the concluding portion of the specification. The invention, however, both as to organization and the method of operation, together with further objects and advantages thereof, may best be understood by reference to the following description taken in connection with the accompanying drawing, in which:

Figure 1:
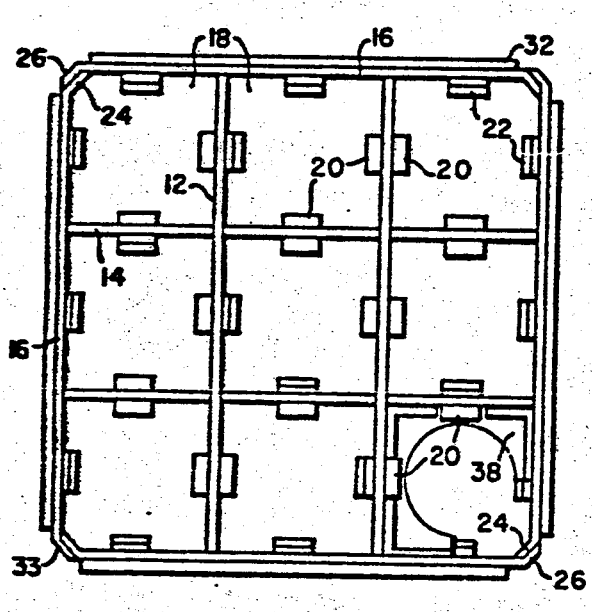
FIG. 1 is a plan view of a fuel assembly grid illustrating the disposition and arrangement of parts immediately prior to welding the overlapping ends of framing members disposed outside the grid.

Referring now to the drawings wherein like reference characters designate like or corresponding parts throughout the several views, there is shown in FIGS. 1 a portion of a conventional grid 10 of the type disclosed in U.S. Pat. No. Re. 28,079 used for holding fuel rods and control rod guide thimbles in a predetermined arrangement in a nuclear reactor fuel assembly. The grid includes a multiplicity of interleaved straps or plates 12, 14 and outer frame members 16 disposed around the grid peripheral surface. The interleaved straps and frame members form a plurality of cells 18 each of which includes inwardly projecting dimples 20 and springs 22 designed to coact either with a fuel rod or control rod guide thimble and hold it firmly in position during reactor operation.

As indicated above, the frame member 16 initially constitutes four individual straps having overlapping ends 24, 26 which are welded together during the grid assembly process. To effect the welding of these frame member overlapping ends, a grid including the peripheral frame member 16 is placed in a fixture 28 which simply includes a base of welded angle irons 30 with flat plate sides 32 welded to the angle irons to form an enclosure of box-like configuration. The angle irons include a flat base 34 on which the strap edges fit when a grid is placed thereon. Each of the four corners intentionally include a space 36 between the adjacent ends of plates 32 through which welding electrodes are placed as more fully described hereafter.

Figure 3:
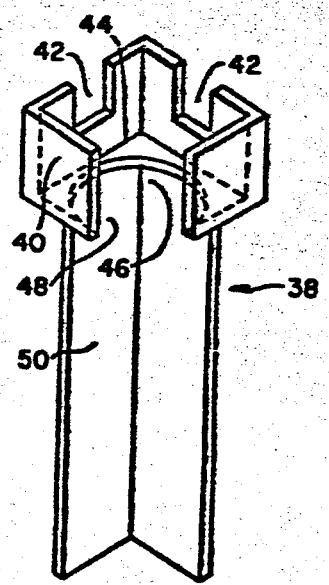
FIG. 3 is an isometric view of the special tool designed to minimize distortion of the grid during the welding process.

At the time of placement of grid 10 into its fixture 28, the grid interleaved straps 12, 14 are completely assembled. The last remaining step includes welding the adjacent overlapping ends of the side frame members to complete the assembly before brazing. To accomplish this step in the process, a tool 38 illustrated in FIG. 3 is placed in each of the four corner cells to help minimize distortion of the frame members during the time of welding. The tool 38 includes a substantially square base 40 having dimensions the same as that desired for each corner cell. Cutout sections 42 are made of a width and depth sufficient to partly encompass each dimple 20 and to establish a point where the overlapping edges will be welded. The central portion 44 includes an opening 46 drilled or otherwise formed therein which merges into a space 48 formed in base 40. Opening 46 and space 48 are chosen of a size to accommodate the tip of a welding tool as more fully described hereafter. To facilitate handling base 40, a pair of legs 50 are integrally formed therewith thus providing convenience in both inserting and positioning the tool 38 in each corner cell.

Since the grid outer dimensions conform closely with the inner dimensions of the fixture, the grid forms a snug fit therewith when placed in position for welding. The frame member overlapping ends are bent to the correct angle and are in contact with each other along their length. Tool 38 is inserted in each corner cell until the bottom of cutout section 42 engages the bottom of dimples 20 on adjacent grid straps. The dimples therefore serve as a stop thus preventing further movement into the cell. When in this position, opening 48 in the tool will be facing the exposed overlapping frame member ends thus providing access to welding tips adapted to be inserted therethrough.

Figure 4:
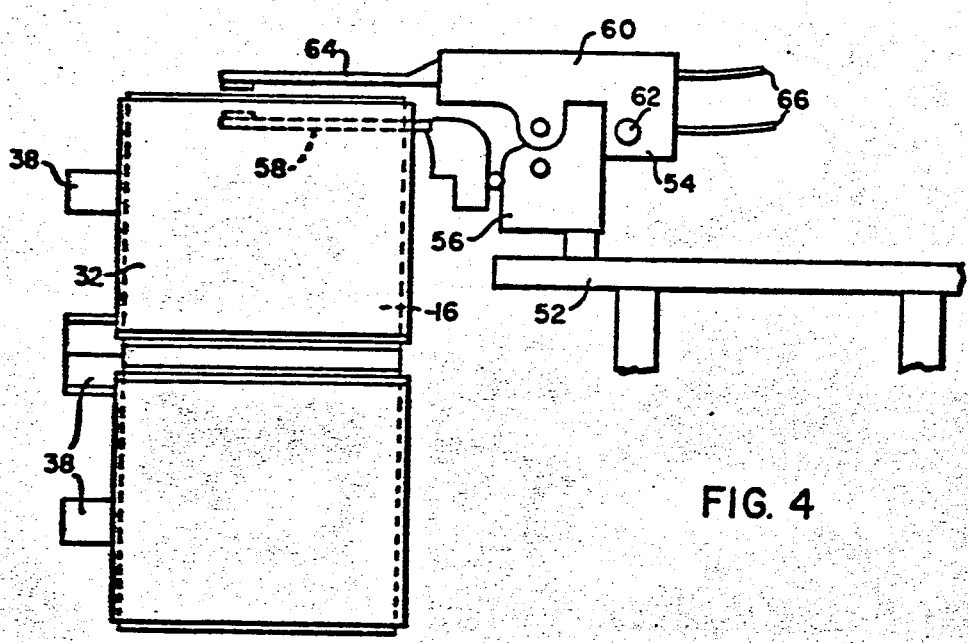
FIG. 4 illustrates the arrangement of welding apparatus and a grid disposed in a fixture during the welding process.
Figure 2:
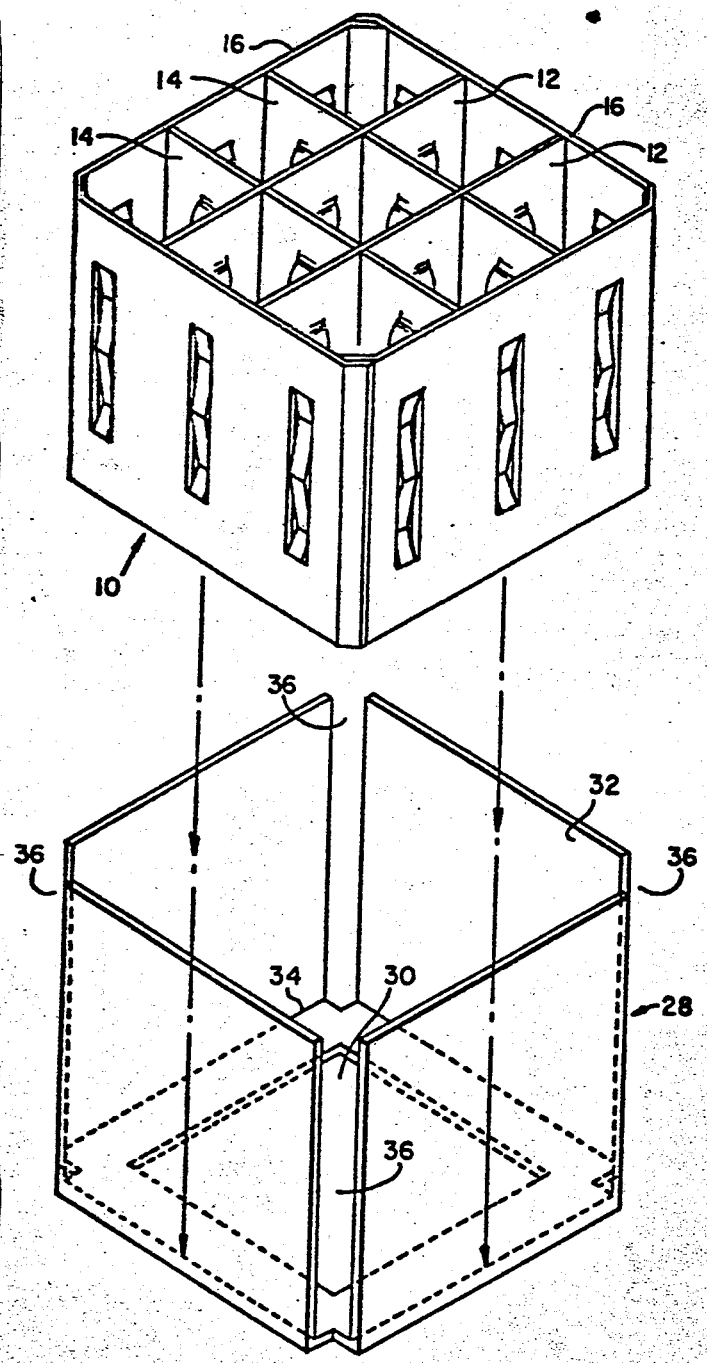
FIG. 2 illustrates the relationship of a fuel assembly grid and a fixture in which it is adapted to be positioned for facilitating the welding of overlapping ends on the framing members.

As illustrated in FIG. 4, the welding apparatus includes a suitable base 52 which supports a stationary housing 54 having an extension 56 which holds a welding tip 58. An upper housing 60 rotatably mounted on the lower housing by pivot 62 also includes a removable welding tip 64 located opposite from and in alignment with welding tip 58. Conductors 66 provide electric power to the welding apparatus operation.

In operation, straps 12, 14 are interleaved to form a grid and outer peripheral frame members 16 having their ends 24, 26 overlapping at each corner cell are placed on the grid. A tool 38 is then inserted in each grid corner cell until the cutout section 52 engages the bottom edge of a grid dimple 20. This tool also is oriented in the corner cell such that the space 48 in the tool space is located in alignment with the opening 33 formed by plates 32 in fixture 28. With the parts situated in this position, the fixture and its enclosed grid and tool are placed on the welding apparatus as shown in FIG. 4. As the fixture is moved onto the lower welding tip electrode, the tip is positioned through the opening 48 in tool 38 and in direct contact with the overlapping ends 24, 26 of frame member 16. This position sets the exact location for a spot weld on the overlapping ends which is then made by depressing upper welding tip 64 into a welding position. After this spot weld and other spot welds are made in each of the corner cells, the tools are removed and reinserted in each cell from the opposite directions until the cutout section again engages the grid dimples. Another spot weld is then made in each corner cell and the welding operation is thus complete.

It will be apparent that many modifications and variations are possible in light of the above teachings. It therefore is to be understood that within the scope of the appended claims, the invention may be practiced other than as specifically described.

I claim:

1. A process for welding framing members of a grid for a nuclear reactor fuel assembly comprising the steps of:

assembling a fuel assembly grid by interleaving straps having dimples and springs thereon to form a grid of egg crate configuration;

placing frame members peripherally around said interleaved grid so that the end of adjacent members overlap one another;

placing said grid in a fixture;

inserting in each of the grid corner cells a tool having outside dimensions equal to the inside dimensions of the corner cells and having an opening therein which is located in alignment with the overlapping frame member ends;

moving said fixture with its enclosed grid and tool onto a welding electrode so that the electrode tip extends through the tool opening and engages the overlapping frame ends;

moving an electrode of opposite polarity into contact with said overlapping ends and opposite said first electrode to thus spot weld said overlapping ends; and removing said fixture from the welding apparatus.

2. The process according to claim 1 including the further step of removing said tools from the grid corner cells and reinserting them in such cells from the opposite direction; and forming an additional spot weld on the overlapping ends of said frame members to thereby impart rigidity to said grid.

3. The process according to claim 1 wherein the step of inserting in each of the grid corner cells a tool having an opening therein further includes inserting said tool a distance sufficient to cause a cutout section thereof to engage the lower end of a dimple formed on the grid straps thereby accurately locating the spot where the spot weld should be made.

4. The process according to claim 1 wherein the step of moving said fixture and its enclosed grid and tools onto a welding electrode further includes the step of permitting the welding electrode to pass through the opening in said tool and through spaced plates on the fixture wherein the space is in alignment with the tool and thereby permitting the welding tip electrode to directly contact the overlapping ends of the frame members.

* * * * *